(12) United States Patent
Heinzmann et al.

(10) Patent No.: US 7,421,932 B1
(45) Date of Patent: Sep. 9, 2008

(54) POWER CUTTING TOOL COMPRISING A RADAR SENSING SYSTEM

(75) Inventors: Fred J. Heinzmann, Del Mar, CA (US); David C. Shafer, Menlo Park, CA (US)

(73) Assignee: Power Tool Institute, Cleveland, OH (US)

( * ) Notice: Subject to any disclaimer, the term of this patent is extended or adjusted under 35 U.S.C. 154(b) by 0 days.

(21) Appl. No.: 11/481,539

(22) Filed: Jul. 6, 2006

Related U.S. Application Data

(63) Continuation of application No. 11/437,323, filed on May 19, 2006, now abandoned.

(60) Provisional application No. 60/682,486, filed on May 19, 2005.

(51) Int. Cl.
B23D 59/00 (2006.01)
B23Q 11/00 (2006.01)

(52) U.S. Cl. ............... 83/58; 83/76.1; 83/370; 83/477.2; 83/DIG. 1

(58) Field of Classification Search ............ 83/58, 83/62, 63, 72, 76.1, 76.6–76.9, 370, 477.2, 83/DIG. 1; 342/90, 109–112; 192/129 R, 192/125 R, 116.5; 318/362; 700/253, 255
See application file for complete search history.

(56) References Cited

U.S. PATENT DOCUMENTS

| | | | | |
|---|---|---|---|---|
| 4,170,013 A | * | 10/1979 | Black | 343/700 MS |
| 5,081,406 A | | 1/1992 | Hughes et al. | |
| 5,942,975 A | | 8/1999 | Sorenson | |
| 6,959,631 B2 | * | 11/2005 | Sako | 83/58 |
| 7,009,552 B2 | | 3/2006 | Sako | |
| 7,047,854 B2 | * | 5/2006 | Sako | 83/58 |
| 7,084,779 B2 | * | 8/2006 | Uneyama | 340/680 |
| 7,173,537 B2 | * | 2/2007 | Voigtlaender | 340/585 |
| 2002/0017176 A1 | | 2/2002 | Gass et al. | |
| 2002/0017178 A1 | | 2/2002 | Gass et al. | |
| 2002/0017336 A1 | | 2/2002 | Gass et al. | |
| 2002/0170399 A1 | | 11/2002 | Gass et al. | |
| 2003/0002942 A1 | | 1/2003 | Gass et al. | |
| 2003/0058121 A1 | | 3/2003 | Gass et al. | |
| 2003/0090224 A1 | | 5/2003 | Gass et al. | |
| 2003/0131703 A1 | | 7/2003 | Gass et al. | |
| 2004/0200329 A1 | | 10/2004 | Sako | |
| 2004/0263383 A1 | | 12/2004 | Sako | |
| 2005/0041359 A1 | | 2/2005 | Gass et al. | |
| 2005/0057206 A1 | | 3/2005 | Uneyama | |
| 2005/0155473 A1 | | 7/2005 | Gass et al. | |
| 2006/0000332 A1 | | 1/2006 | Sako | |

FOREIGN PATENT DOCUMENTS

EP 1422022 A1 5/2004

* cited by examiner

*Primary Examiner*—Stephen Choi
(74) *Attorney, Agent, or Firm*—K & L Gates LLP

(57) ABSTRACT

A power cutting tool having a movable blade, such as a table saw, comprising a radar sensing system for movement of an object in a region near the blade is disclosed. The radar sensing system emits a radio frequency wave and receives wave energy reflected by the object. The system measures the Doppler shift of the received wave energy to detect the presence of a fast moving object in a zone near the blade. When such a condition is detected, a reaction system can be activated to mitigate the condition.

15 Claims, 3 Drawing Sheets

POWER CUTTING TOOL COMPRISING A RADAR SENSING SYSTEM

CROSS-REFERENCE TO RELATED APPLICATIONS

The present application is a continuation of U.S. patent application Ser. No. 11/437,323, filed May 19, 2006 now abandoned, which claims priority U.S. provisional patent application Ser. No. 60/682,486 filed May 19, 2005, both of which are hereby incorporated by reference.

BACKGROUND OF THE INVENTION

The present invention generally relates to sensing or detecting systems and, more particularly, to overhead radar sensing and detecting systems.

Detection or sensing systems have been developed for use with various kinds of manufacturing equipment and power tools. Such detection systems are operable to trigger some type of condition mitigation mechanism by detecting or sensing the proximity of the operator to some part of the equipment or contact with some part of the equipment by the operator.

For example, it is known to use a capacitive contact sensing system to detect contact between an operator and a blade of a table saw. In such systems, a signal is capacitively coupled to the blade and the signal on the blade is monitored to detect changes in the signal indicative of contact between the operator and the blade. Such capacitive sensing systems, however, are only practically able to detect contact between the operator and the blade. Such systems cannot practically detect the proximity of the user's hand to the blade as an advance indication of a potentially dangerous condition. Detection systems that could detect when the user's hand or other object comes near the blade would be desirable.

SUMMARY OF THE INVENTION

In one general aspect, the present invention is directed to a power cutting having a rotatable blade, such as a table saw, comprising a radar sensing system for movement of an object in a region near the blade. The radar sensing system emits a radio frequency wave and receives wave energy reflected by the object. The system measures the Doppler shift of the received wave energy to detect the presence of a fast moving object in a zone near the blade. When such a condition is detected, a reaction system can be activated to mitigate the condition.

According to various implementations, the radar sensing system may also detect the direction of movement of the object (e.g., either toward or away from the sensing system). In addition, the radar sensing system may be, for example, a continuous wave radar sensing system or a range-gated radar sensing system. Also, a number of radar sensing systems may be used, such as on opposite sides of the blade. Further, the radar sensing system may comprise at least one antenna positioned below the cutting surface of the cutting tool. For example, the antenna may be positioned in an open-ended waveguide, wherein an open-end of the waveguide is at the cutting surface. Also, the antenna may be aligned along the axis of rotation of the blade.

DESCRIPTION OF THE DRAWINGS

Various embodiments of the present invention are described herein by way of example in conjunction with the following figures, wherein.

DETAILED DESCRIPTION

Figure 1:
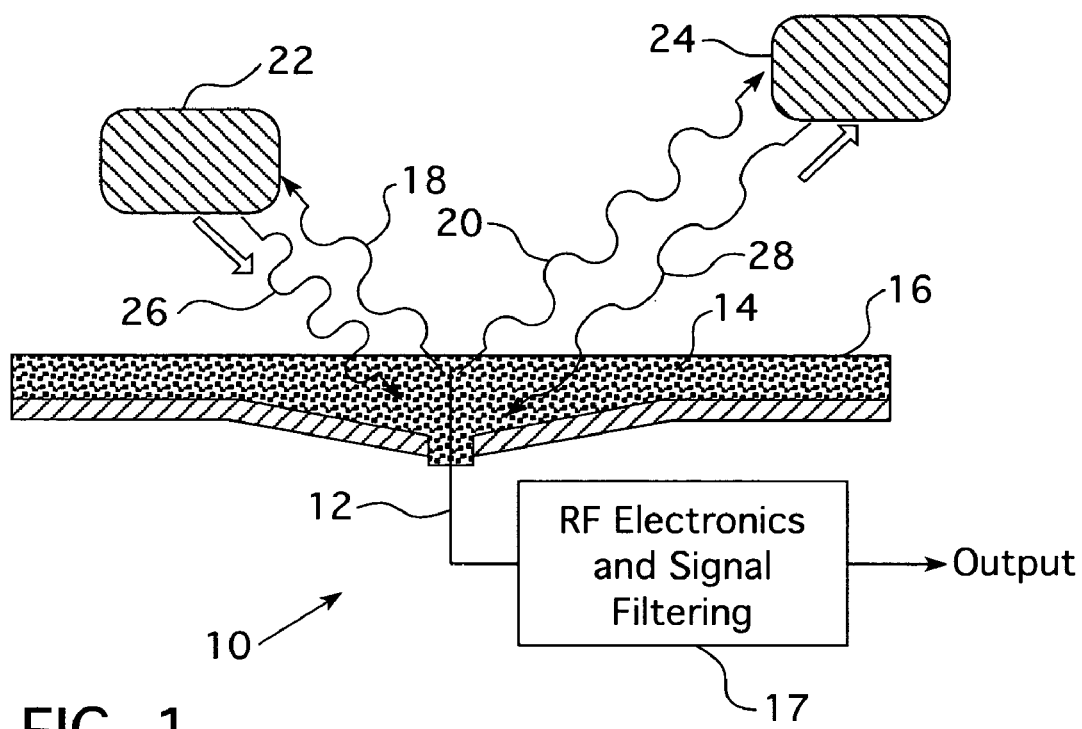
FIG. 1 is an idealized partially schematic diagram of an embodiment of the radar sensing system of the present invention shown as implemented in a table saw.

A radar sensing system 10 according to various embodiments of the present invention is shown in the idealized partially schematic diagram of FIG. 1. The system 10 comprises an antenna 12 and associated RF electronics and signal filtering circuitry 17. In the illustrated embodiment, the radar sensing system is implemented in a table saw having a table top or cutting surface 16. It should be understood that the present invention can be used with other types of power cutting tools and machinery, and that such implementations are within the scope of the present invention. For example, the radar sensing system may be used in a circular saw, a jig saws, or other types of power cutting tools, including other types of portable saws.

The radar sensing system 10 may use Doppler radar sensors, such as continuous wave ("CW") or range gated Doppler radar sensors. Both of theses types of sensors use the Doppler shift of the reflected signal as an object moves toward or away from the sensor to estimate the radial component of the object's velocity. This information may be used as one component of a decision to activate a reaction system. These sensing systems 10 could be used in conjunction with many different types of reaction systems, and could also be applied to other types of equipment that employ moving blades, grinding members, and other various types of work tools. One such reaction system is described in U.S. patent application Ser. No. 11/374,319, filed 13 Mar. 2006, which is incorporated herein by reference.

The sensing system 10 described here uses the Doppler shift of the return signal as the sole discriminant, though additional information could also be used to attempt to distinguish the motion of body parts (as opposed to wood and other cut materials) in the sensing area. However, in one particular application the use of such additional information is an unnecessary complication, since the presence of fast motion in the area of the blade (other than that of the blade itself) is an indication of a potentially dangerous condition that causes the reaction system to be activated.

Radar sensors operate by emitting a radio-frequency wave, and detecting the wave reflected from a target object. The reflected wave can be modified according to the characteristics of the target, and in this present implementation, the velocity of the target object is the principal interest. If the emitted signal consists largely of a single frequency component, the component of the target motion that is along the line between the target and the sensor impresses on the return signal the well-known Doppler shift of:

$$\Delta f = \frac{2 f_0 v}{c}$$

where:
Δf is the frequency shift of the return signal
$f_o$ is the carrier frequency of the transmission
v is the component of velocity of the target toward the radar
c is the speed of light.

The frequency shift between the transmitted and received signals is typically measured by mixing the two signals, and the beat frequency produced at the output from the radar sensor may be used to determine the velocity component of the motion of the target.

The target must move some distance in order to be detected, and the distance the target must move is inversely proportional to the transmitted frequency. For example, if one cycle of the Doppler waveform is needed for detection, the distance the target must move is given by:

$$D_{det} = 0.5 \times \frac{c}{f_0} = \frac{\lambda}{2}$$

The distance required to detect the target motion is inversely proportional to the carrier frequency used (and is equal to half of the transmitted wavelength if one cycle of Doppler waveform is needed for detection). Therefore, to minimize the required target motion prior to detection, it may be desirable to use as high a transmitting frequency as possible. The use of high frequencies has the additional advantage that smaller antennas may be used at higher frequencies.

However, there are factors that may work to limit the possible transmit frequencies. For example, only a set of discrete frequency bands can be used for unlicensed operation and absorption of both the transmitted and received signals by wet wood is larger at higher frequencies. Also, the cost to build the transmitter and receiver circuits gets higher as the frequency is increased.

In various embodiments, a transmit frequency of 5.8 GHz is used, which is a compromise between the above factors. It should be understood that other frequencies can be used in a similar system.

Figure 4:
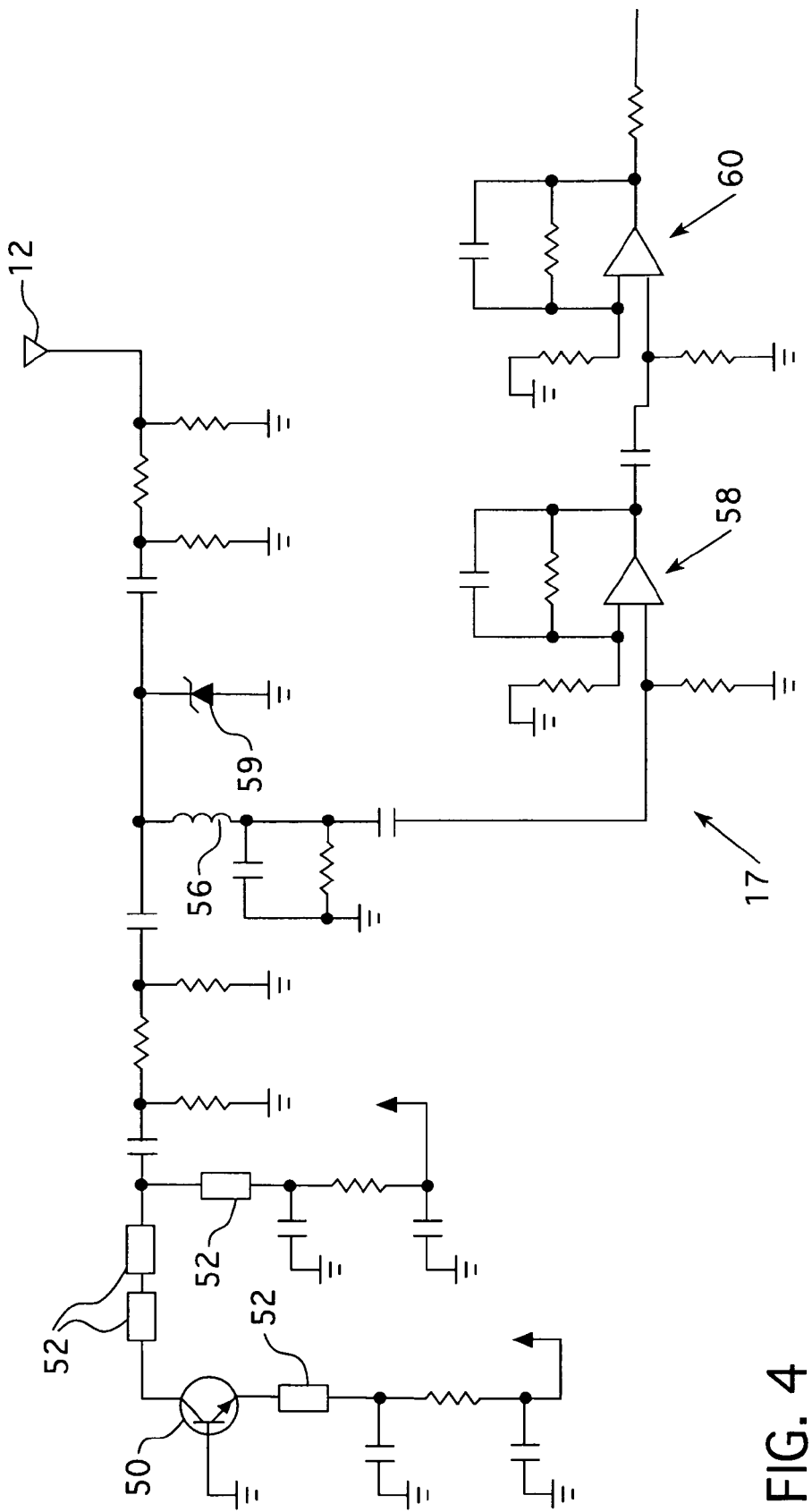
FIG. 4 is an electrical schematic diagram of a CW type sensor that can be used with the embodiment shown in FIG. 1.

The radar sensing system 10 shown in the embodiment of FIG. 1 uses a CW Doppler sensor. A simplified schematic circuit diagram for the RF and signal filtering circuitry 17 for such an embodiment is shown in FIG. 4 and will hereinafter be described. This sensing system 10 uses a transmit oscillator operating at a fixed frequency (in this example, 5.8 GHz), and a single antenna 12 to simultaneously transmit and receive. The received signal is mixed with the transmit signal to generate a beat frequency, which is then amplified and provided at the sensor's output. This output contains frequency components proportional to the component of the target's velocity along the line between the target and the antenna 12, and is filtered to isolate the range of frequencies corresponding to the prohibited velocities. In this example, with the sensing system 10 operating at 5.8 GHz, the Doppler frequency of 29.5 Hz corresponds to target motion of approximately 30 in/sec. So to exclude target motion in the range of 30 to 240 in/sec, a filter passing frequencies from approximately 30 to approximately 240 Hz is preferably used.

With reference to FIG. 1, the antenna 12 may be embedded in a dielectric 14 that forms a cutting surface 16 for the power cutting tool (e.g., a table saw), but the antenna 12 could alternatively be placed below a metallic table, and transmit and receive radio frequency waves through a dielectric plug covering an opening in the metallic table (as described further below in connection with FIG. 3). In operation, the sensing system 10 transmits waves 18, 20 to objects 22, 24, respectively, and receives reflected waves 26, 28 from the objects 22, 24. When these objects have a component of motion that is either toward or away from the antenna 12, a non-zero Doppler shift beat frequency is produced.

For a simple CW sensing system, there may not be any particularly accurate distance information available as a result of its operation. However, the strength of the reflected signal from a small object generally falls off with the fourth power of the distance from the target to the sensing antenna 12, and this will effectively limit the sensing system range, though not with a sharp distance cutoff.

Although the attenuation characteristics of the above described CW sensing system 10 may provide enough attenuation to prevent false tripping of the reaction system that could be caused by rapid motion of large objects that are not close enough to the blade, it may be desirable to have a sharp distance cutoff in the operation of the sensing system 10. Such a sharp distance cutoff is possible by using a range-gated Doppler sensing system, which instead of transmitting continuously, transmits a short burst of RF signal, and samples the reflected or return signal after some typically fixed time delay.

Figure 2:
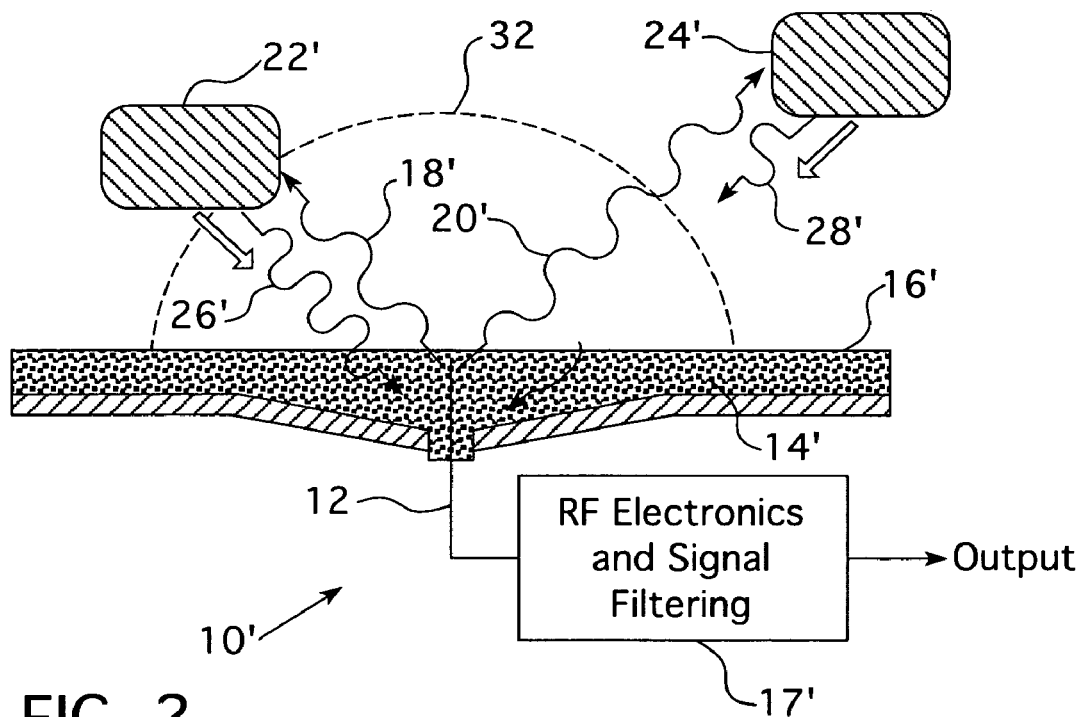
FIG. 2 is an idealized partially schematic diagram of an alternative preferred embodiment of the radar sensing system of the present invention shown as implemented in a table saw.

The operation of this type of sensing system is illustrated in FIG. 2. In a range-gated sensing system 10', the sampling time (the "range gate") is set so that the RF energy only has time to propagate from the antenna 12 out to the desired distance, reflect, and propagate back to the antenna 12. That distance is shown by the boundary 32 illustrated by a dotted semi-circle in FIG. 2. Any object, such as object 24', that is located outside of the boundary 32 will still receive the transmitted energy wave 20', and will still have a reflected wave 28', but the received energy wave 28' does not have time to make it back to the antenna 12 before the range gate is closed. Thus, the detection is sensitive only to target motion within the maximum distance boundary 32 set by the range gate, and any motion outside this distance, no matter how large the reflecting object or the speed of its motion, is not detected. In the illustrated example, because the object 22' is inside of the boundary 32, the range gate is not closed before the return or reflected wave 26' reaches the antenna 12. The sensing system 30 can therefore detect the wave 26' and, hence, the object 22'.

The added complexity of range gate circuitry 17' is not very high, but since the range-gated sensing system 30 only transmits part of the time, the receiver noise figure is higher in proportion to the transmit duty cycle. Therefore, unless the sharp distance cutoff of the range-gated sensing system 10' is needed in a particular application, a CW Doppler sensing system may be preferred.

A characteristic of range-gated sensing systems is that their outputs do not discriminate between motion toward or away from the sensor. This may be considered to be an advantage in a system designed to detect any rapid motion near a cutting blade or moving tool, regardless of direction because such rapid motion may be indicative of a condition that warrants activation of the reaction system. However, in some applications it may be desirable to determine whether a particular motion is toward or away from the sensing system 10.

In another embodiment, in order to detect whether the motion is toward or away from a range-gated sensor, since the range-gated sensing system 10' transmits a discrete pulse train, it is relatively simple to modify the circuitry 17' in such a way that some pulses are timed with the range gate set to its nominal value (corresponding to the desired distance cutoff), and alternate pulses timed with a difference in the time delay corresponding to one-quarter of a wavelength. For example, alternate pulses can be detected at the nominal delay and at the altered delay. By doing this, the Doppler signal is modulated at one-half of the pulse repetition rate of the sensing system 10', which may be a much higher frequency than the Doppler shift itself. These higher-frequency signals are easier to amplify without adding excessive noise than the baseband Doppler signals themselves, particularly for low-speed motion.

Motion toward or away from the sensing system 10 can be distinguished with this embodiment. The two Doppler signals (one constructed from the samples at the nominal delay and one from the samples at the changed delay) can be considered as real and imaginary components of a single complex waveform, and the phase of this complex waveform can be tracked. An advancing or retarding phase indicates the direction of motion, with the sign depending on whether the changed delay is advanced or retarded by one-quarter of a wavelength. The frequency of the complex signal indicates the magnitude of the velocity component, as previously described.

A number of sensing systems 10 (whether CW or range-gated or a combination) may be used to detect motion of a target near a blade or other moving component of a power cutting tool. In some applications, it may be preferable that the antenna for the systems 10 not protrude above the surface of the table. A embodiment having a pair of antennas 12a-b is shown in FIG. 3. In the illustrated embodiment, each antenna 12a-b is located in an open-ended waveguide 40 mounted below the surface 16 of the table 42. Also, a respective dielectric plug 44a-b may be positioned in the open end of the waveguides 40a-b.

The placement and number of sensing system 10 determines the size and shape of the zone in which rapid motion will be detected. For transmit frequencies which penetrate typical cut materials and provide a sufficiently short motion distance for Doppler detection, practical antenna sizes are in the range of a few inches across, which because of their location in the saw table, may not practically allow much larger antennas to be used. Therefore, the pattern of sensitivity of these systems is relatively broad, and motion within a hemisphere centered on the sensing system 10 is nearly equally detected.

However, if each antenna 12a-b is placed so that they are near the blade 46 but on opposite sides so that the sensitive zone is nearly centered on the blade 46, there is some shadowing effect on the side of the blade 46 opposite each of the respective antenna locations. For example, measurements with a typical blade 46 and sensor operating at 5.8 GHz shows a shadowing effect of about 5 dB (one-way loss) at angles of up to 80 degrees from vertical. This may be acceptable for some applications, allowing only one sensing system 10 to be needed. There is a zone directly along the table, on the opposite side of the blade 46 from the antenna location, where the sensitivity loss approaches 15 dB (one-way loss). If sensitivity in this zone is required, the two sensing systems 10 on opposite sides of the blade 46 may be used, as shown in FIG. 3, with the detected outputs combined with an OR function to trigger the reaction system.

Figure 3:
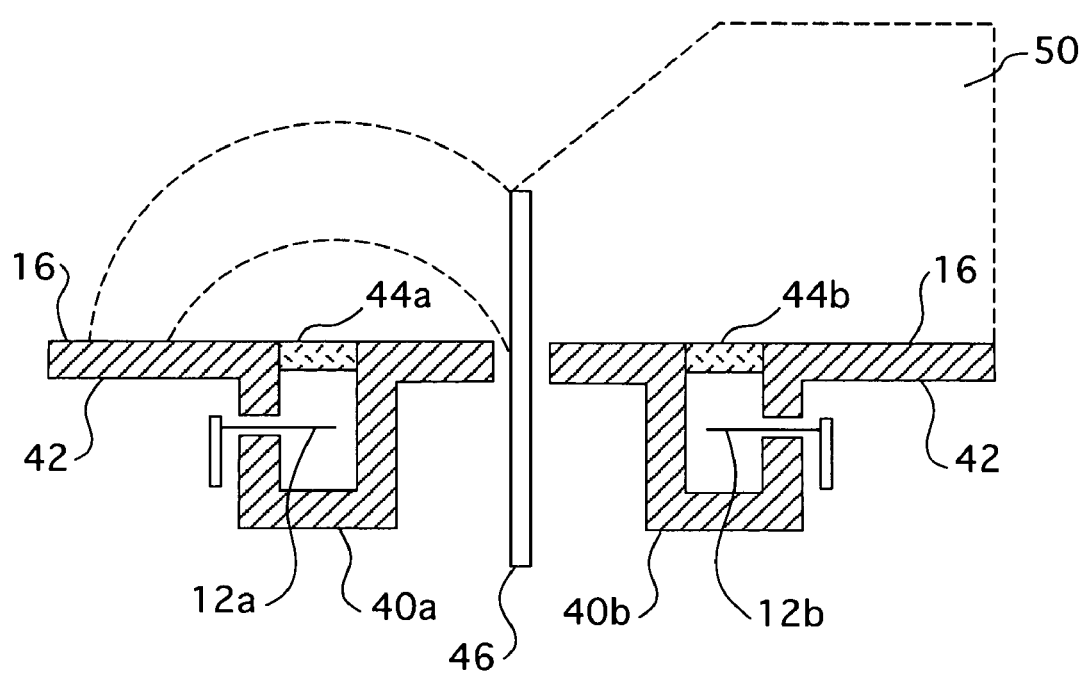
FIG. 3 is an is an idealized partially schematic diagram of a radar antenna configuration that can be used with the embodiments of the radar sensing system of the present invention shown in FIGS. 1 and 2.

The antennas 12 shown in FIG. 3 are aligned along the axis of rotation of the blade 46, but this is not required, and the antennas may be positioned, or additional antennas for additional sensing systems employed, to obtain the desired shape for the region of sensitivity. If multiple sensing systems 10 are used, their outputs are combined with an OR function to trigger the reaction system.

An electrical schematic circuit diagram for the RF electronics and signal filtering circuitry 17 for a representative CW Doppler sensing system 10 is shown in FIG. 4. With reference to the components in that schematic, transistor 50 and its associated passive components form an oscillator, which continuously runs at a frequency determined by surrounding transmission line elements 52, which is preferably about 5.8 GHz. The antenna 12 is both a transmitting and a receiving antenna, which preferably is a monopole which is inserted into the open-ended waveguide 40, and is resonant at 5.8 GHz. A Schottky diode 54 operates as a mixer, generating the beat-frequency signals from the transmitted and Doppler-shifted received signals. An inductor 56 and the associated components blocks the carrier-frequency and other high-frequency components generated by the mixing operation from entering baseband amplifiers 58 and 60. These amplifiers amplify the beat-frequency components and drive the output signal from the sensing system 10.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

What is claimed is:

1. A power cutting tool comprising:
   a platform having a cutting surface;
   a movable blade for cutting an object on the cutting surface; and
   at least one radar sensing system comprising:
      an open-ended waveguide having a longitudinal axis parallel to the plane of the blade and perpendicular to the cutting surface, the open-ended waveguide having an open end at the cutting surface of the platform and adjacent to the blade;
      an antenna element positioned below the cutting surface, wherein the antenna element is inserted into the open-ended waveguide, and wherein the antenna element is perpendicular to the longitudinal axis of the open-ended waveguide; and
      circuitry connected to the antenna element for producing an output related to the velocity of an object in a velocity range in a region near the blade and above the cutting surface.

2. The power cutting tool of claim 1, wherein the radar sensing system detects a direction of movement of the object.

3. The power cutting tool of claim 1, wherein the radar sensing system comprises a continuous wave radar sensing system.

4. The power cutting tool of claim 1, wherein the radar sensing system comprises a range-gated radar sensing system.

5. The power cutting tool of claim 1, further comprising a dielectric plug positioned in the open-end of the waveguide.

6. The power cutting tool of claim 5, wherein the antenna is aligned along the axis of rotation of the movable blade.

7. The power cutting tool of claim 1, wherein the antenna is aligned along the axis of rotation of the movable blade.

8. A table saw comprising:
   a table having a cutting surface;
   a rotatable blade disposed in an opening defined by the table such that at least a portion of the rotatable blade extends above the cutting surface; and
   at least one radar sensing system comprising:
      an open-ended waveguide having a longitudinal axis parallel to the plane of the blade and perpendicular to the cutting surface, the open-ended waveguide having an open end at the cutting surface of the platform and adjacent to the blade;

an antenna element positioned below the cutting surface, wherein the antenna element is inserted into the open-ended waveguide, and wherein the antenna element is perpendicular to the longitudinal axis of the open-ended waveguide; and circuitry connected to the antenna element for producing an output related to the velocity of an object in a velocity range in a region near the blade and above the cutting surface.

9. The table saw of claim 8, wherein the radar sensing system detects a direction of movement of the object.

10. The table saw of claim 8, wherein the radar sensing system comprises a continuous wave radar sensing system.

11. The table saw of claim 8, wherein the radar sensing system comprises a range-gated radar sensing system.

12. The table saw of claim 8, further comprising a dielectric plug positioned in the open-end of the waveguide.

13. The table saw of claim 12, wherein the antenna is aligned along the axis of rotation of the rotatable blade.

14. The table saw of claim 8, wherein the antenna is aligned along the axis of rotation of the rotatable blade.

15. A table saw comprising:
a table having a cutting surface;
a rotatable blade disposed in an opening defined by the table such that at least a portion of the rotatable blade extends above the cutting surface, the blade having first and second lateral sides; and
a radar sensing system comprising:
a first open-ended waveguide having a longitudinal axis parallel to the plane of the blade and perpendicular to the cutting surface, the first open-ended waveguide having an open end at the cutting surface of the platform and adjacent to the first lateral side of the blade;
a first antenna element positioned below the cutting surface, wherein the first antenna element is inserted into the first open-ended waveguide, and wherein the first antenna element is perpendicular to the longitudinal axis of the first open-ended waveguide;
a second open-ended waveguide having a longitudinal axis parallel to the plane of the blade and perpendicular to the cutting surface, the second open-ended waveguide having an open end at the cutting surface of the platform and adjacent to the second lateral side of the blade;
a second antenna element positioned below the cutting surface, wherein the second antenna element is inserted into the second open-ended waveguide, and wherein the second antenna element is perpendicular to the longitudinal axis of the second open-ended waveguide;
circuitry connected to the first and second antenna elements for producing an output related to the velocity of an object in a velocity range in a region near the blade and above the cutting surface.

* * * * *

UNITED STATES PATENT AND TRADEMARK OFFICE
CERTIFICATE OF CORRECTION

| | |
|---|---|
| PATENT NO. | : 7,421,932 B1 |
| APPLICATION NO. | : 11/481539 |
| DATED | : September 9, 2008 |
| INVENTOR(S) | : Fred J. Heinzmann and David C. Shafer |

It is certified that error appears in the above-identified patent and that said Letters Patent is hereby corrected as shown below:

Column 2, Line 7, delete "is an is an idealized" and substitute therefor --is an idealized--.

Column 2, Line 26, delete "circular saw, a jig saws," and substitute therefor --circular saw, a jig saw--.

Column 5, Line 24, delete "of the table. A embodiment" and substitute therefor --of the table. An embodiment--.

Signed and Sealed this

Twenty-fourth Day of February, 2009

JOHN DOLL
*Acting Director of the United States Patent and Trademark Office*